United States Patent [19]

Cox

[11] Patent Number: 4,673,561
[45] Date of Patent: Jun. 16, 1987

[54] PROCESS FOR THE MANUFACTURE OF HYDRATED OXIDES AND TRI- AND TETRA-BASIC LEAD SULPHATES

[75] Inventor: David Cox, North Sydney, Australia

[73] Assignee: Gasohol Energy Pty. Ltd., Australia

[21] Appl. No.: 845,691

[22] PCT Filed: Jul. 25, 1985

[86] PCT No.: PCT/AU85/00167
§ 371 Date: Mar. 3, 1986
§ 102(e) Date: Mar. 3, 1986

[87] PCT Pub. No.: WO86/00878
PCT Pub. Date: Mar. 13, 1986

[30] Foreign Application Priority Data

Jul. 27, 1984 [AU] Australia .............................. PG6262

[51] Int. Cl.$^4$ ...................... C01G 21/02; C01G 21/20; C01G
[52] U.S. Cl. .................................... 423/559; 423/619; 423/620
[58] Field of Search ......................... 423/554, 619, 620

[56] References Cited

U.S. PATENT DOCUMENTS

| 452,386 | 5/1891 | Pennington | 423/559 |
|---|---|---|---|
| 3,194,685 | 7/1965 | Malloy | 423/559 |
| 3,230,043 | 1/1966 | Voss et al. | 423/619 |
| 3,323,859 | 4/1967 | Szczepanek et al. | 423/559 |
| 3,450,496 | 6/1969 | Kwestroo et al. | 423/619 |
| 3,497,382 | 2/1970 | Kwestroo et al. | 423/619 |
| 3,855,402 | 12/1974 | Bratt | 423/559 |

FOREIGN PATENT DOCUMENTS 932523 7/1963 United Kingdom ................ 423/619

Primary Examiner—H. T. Carter
Attorney, Agent, or Firm—Laff, Whitesel, Conte & Saret

[57] ABSTRACT

Process for the manufacture of hydrated lead oxides in the bivalent state characterized by the step of (1) reacting metallic lead with acetic acid (e.g. ammonium acetate, 5%-30% solution) at a temperature up to 200° C. (e.g. 50°-200° C.) under an atmosphere of an oxygen containing gas (e.g. oxygen) of between 1 and 10 atmospheres absolute pressure to form lead acetate, then (2) reacting the lead acetate with a source of ammonium ion (e.g. ammonia) under an absolute pressure between 1 and 5 atmospheres at a temperature up to 100° C. (e.g. 60°-90° C.) to precipitate lead oxides and, optionally, to produce tri- and tetra- basic lead sulphates, by (3) adding to the lead oxides so precipitated sulphuric acid in the stoichliometric amount to produce tri- or tetra-basic lead sulphate, then (4) separating and drying the tri- or tetra- basic lead sulphate so formed.

10 Claims, 1 Drawing Figure

TBLS: TRI BASIC LEAD SULPHATE

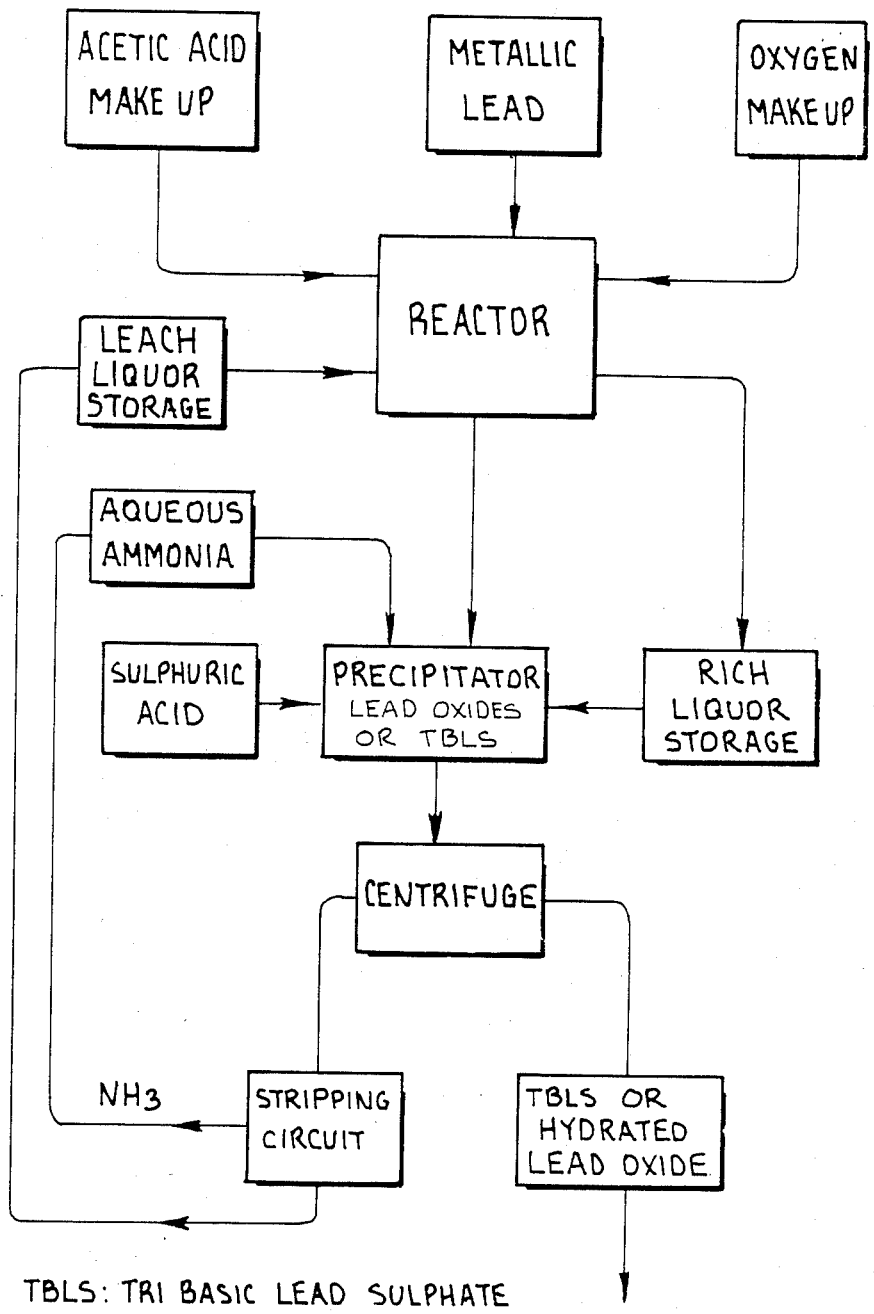
TBLS: TRI BASIC LEAD SULPHATE

PROCESS FOR THE MANUFACTURE OF HYDRATED OXIDES AND TRI- AND TETRA-BASIC LEAD SULPHATES

TECHNICAL FIELD

This invention relates to the manufacture of hydrated lead oxides in the bivalent state which may be used commercially as the starting point in the making of all lead chemicals.

More particularly these hydrated lead oxides are useful in the plastic industry to produce stabilizers for polyvinyl chloride resins against thermal and ultraviolet degradation. Typical derivatives are tri-basic lead sulphate, tetra-basic lead silico sulphate, lead silicon sulphate, dibasic lead phosphite, lead phthalate, dibasic lead stearate and lead stearate.

The hydrated lead oxides are also useful in the paint and pigment industry.

BACKGROUND ART

The stabilizers aforementioned are presently manufactured by a process which involves the production of litharge by blowing air through molten lead at very high temperatures. The litharge so produced is slurried with water and then with sulphuric acid under controlled conditions to cause the tri-basic lead sulphate to precipitate. This precipitate is separated and dried ready for use as a stabilizer. It is found that this process causes a high degree of atmospheric pollution, and that the final product contains an undesirably high concentration of unreacted lead. For instance in U.S. Pat. No. 3,323,859 dibasic lead salt stabilizers for PVC are manufactured by reacting litharge with dilute acetic acid, and the dibasic lead acetate so formed is reacted with sodium sulphate.

Various approaches have been taken to avoid the use of litharge in the production of stabilizers. In U.S. Pat. No. 452,386, metallic lead is converted to lead acetate by subjecting it to the alternate action of dilute acetic acid and of atmospheric air, then reacting the lead acetate with sulphuric acid.

DISCLOSURE OF THE INVENTION

It is the principal object of the present invention to provide a process for the manufacture of hydrated lead oxides in the bivalent state, which minimizes pollution and yields a product which may be utilized in the paints and pigment industries and also to avoid the use of litharge in the production of PVC stabilizers.

Accordingly there is provided a process for the manufacture of hydrated lead oxides in the bivalent state characterized by the steps of (1) reacting metallic lead with acetic acid at a temperature up to 200° C. under an atmosphere of an oxygen containing gas of between 1 and 10 atmospheres absolute pressure to form lead acetate, then (2) reacting the lead acetate with a source of ammonium ion under an absolute pressure between 1 and 5 atmospheres up to 100° C. to precipitate hydrated lead oxides.

The acetic acid may be present in concentrations of up to 50% wt., preferably up to 25% wt. and if added as ammonium acetate concentrations of up to 50% wt., preferably 35% wt. should be used.

In a preferred embodiment of the invention the process may include the additional step of adding sulphuric acid and/or ammonium sulphate to the hydrated lead oxides to produce tri- or tetra-basic lead sulphate. Additionally the tri- or tetra-basic lead sulphate can be separated and dried.

In a particularly preferred form of the invention is a process for the manufacture of tri- and tetra-basic lead sulphates, characterized by the steps of (1) reacting excess metallic lead with an aqueous solution containing between 5% and 30% by weight of ammonium acetate at a temperature between 50° C. and 200° C. under an atmosphere of oxygen of between 1 and 10 atmospheres absolute pressure to form lead acetate, then (2) reacting the lead acetate so formed with ammonia under an absolute pressure between 1 and 5 atmospheres at a temperature between 15° C. and 100° C., preferably 60° C. to 90° C., to precipitate lead oxides, then (3) adding to the lead oxides so precipitated sulphuric acid in the stoichiometric amount to produce tri- or tetra-basic lead sulphate, then (4) separating and drying the tri- or tetra-basic lead sulphate so formed.

Preferably in step (1) the concentration of the aqueous solution of ammonium acetate is between 15% and 25% by weight, the temperature is between 80° C. and 120° C., and the pressure is between 3 and 5 atmospheres absolute.

In a most preferred form of step (1) the concentration of the aqueous solution of ammonium acetate is 20% by weight, the temperature is 100° C., and the pressure is 2.5 atmospheres absolute, and in step (2) the temperature is 80° C. and the pressure is 3 atmospheres absolute.

The following examples disclose two forms of the invention and the accompanying single sheet of drawing is a flow chart which diagrammatically illustrates the procedures followed:

EXAMPLE 1

An aqueous solution of ammonium acetate at a concentration of 35% by weight and a temperature of 100° C. was reacted for 1 hour with excess metallic lead in a closed reactor through which oxygen was passed. The ammonium acetate dissociates and the acetic acid formed reacted with the lead under an atmosphere of oxygen at 5 atmospheres absolute pressure to produce a lead acetate solution and ammonia. The ammonia was carried away and condensed and the oxygen stream was returned to the reactor.

The temperature of the aqueous solution of lead acetate was adjusted to 80° C., and it was transferred to a precipitator, into which ammonia including that recovered from the previous stage was directed until a pressure of 3 atmospheres absolute was achieved. Hydrated lead oxides were precipitated, and ammonium acetate solution was formed.

EXAMPLE 2

The same procedure as disclosed in Example 1 was followed.

Sulphuric acid in the stoichiometric amount reacted with the hydrated lead oxides of Example 1 in the precipitator thereby converting the hydrated lead oxides into tri-basic lead sulphate, which formed a precipitate. This precipitate was separated from the liquid in which it was dispersed, and dried. Starting with 83.6 kg. of lead, a yield of 100 kg. of dry tri-basic lead sulphate was obtained.

The resulting solid was incorporated as a stabilizer in polyvinyl chloride resin, which was then passed through an extruder to form test pieces. The liquid was heated in a stripping circuit to drive off any dissolved ammonia, which was recovered for re-use and to adjust the concentration of ammonium acetate to 35% by weight. It was then directed to the reactor for the first stage of a repetition of the process on a fresh batch of metallic lead.

On comparison with similar pieces made from the same resin with commercially available stabilizers, the test pieces provided by the process according to the present invention were found to be more effectively stabilized without sacrifice of any desirable properties of the resin. Furthermore, the tribasic lead sulphate resulting from the process according to the present invention was substantially free (less than 5 ppm) of elemental lead, mono basic lead sulphate and unreacted lead oxides.

It will be observed that the method according to the present invention operates at moderate temperatures and pressures, so that the capital cost of the apparatus required is considerably less than that required for the conventional process, and the operating costs are also lower.

I claim:

1. A process for the manufacture of hydrated lead oxides in the bivalent state characterized by the steps of (1) reacting metallic lead with acetic acid at a temperature up to 200° C. under an atmosphere of an oxygen containing gas of between 1 and 10 atmospheres absolute pressure to form lead acetate, then (2) reacting the lead acetate with a source of ammonium ion under an absolute pressure between 1 and 5 atmospheres at a temperature up to 100° C. to precipitate hydrated lead oxides.

2. A process according to claim 1 wherein the concentration of acetic acid is up to 50% wt., preferably up to 25% wt.

3. A process according to claim 1 wherein the acetic acid is added in the form of an aqueous solution containing ammonium acetate.

4. A process according to claim 3 wherein the concentration of ammonium acetate in the aqueous solution is up to 50% wt., preferably up to 35% wt.

5. A process according to claim 1 comprising the additional step of adding sulphuric acid and/or ammonium sulphate to the hydrated lead oxides to produce tri- or tetra-basic lead sulphate.

6. A process according to claim 5 comprising the additional step of separating and drying the tri- or tetra-basic lead sulphate.

7. A process for the manufacture of tri- and tetra-basic lead sulphates, characterized by the steps of (1) reacting excess metallic lead with an aqueous solution containing between 5% and 30% by weight of ammonium acetate at a temperature between 50° C. and 200° C. under an atmosphere of oxygen of between 1 and 10 atmospheres absolute pressure to form lead acetate, then (2) reacting the lead acetate so formed with ammonia under an absolute pressure between 1 and 5 atmospheres at a temperature between 15° C. and 100° C., preferably 60° C. to 90° C. to precipitate lead oxides, the (3) adding to the lead oxides so precipitated sulphuric acid in the stoichiometric amount to produce tri- or tetra-basic lead sulphate, then (4) separating and drying the tri- or tetra-basic lead sulphate so formed.

8. A process according to claim 7, characterized in that in step (1) the concentration of the aqueous solution of ammonium acetate is between 15% and 25% by weight, the temperature is between 80° C. and 120° C., and the pressure is between 3 and 5 atmospheres absolute.

9. A process according to claim 7 or 8, characterized in that step (2) is conducted at a temperature between 60° C. and 90° C.

10. A process according to claim 7, characterized in that in step (1) the concentration of the aqueous solution of ammonium acetate is 20% by weight, the temperature is 100° C., and the pressure is 2.5 atmospheres absolute, and in that in step (2) the temperature is 80° C. and the pressure is 3 atmospheres absolute.

* * * * *